United States Patent
Phan et al.

(10) Patent No.: US 11,803,997 B2
(45) Date of Patent: Oct. 31, 2023

(54) AUTOMATIC HEAD POSE NEUTRALIZATION AND BLEND SHAPE GENERATION

(71) Applicant: Electronic Arts Inc., Redwood City, CA (US)

(72) Inventors: Hau Nghiep Phan, Montreal (CA); Mathieu Marquis Bolduc, St-Laurent (CA)

(73) Assignee: Electronic Arts Inc., Redwood City, CA (US)

( * ) Notice: Subject to any disclaimer, the term of this patent is extended or adjusted under 35 U.S.C. 154(b) by 69 days.

(21) Appl. No.: 17/651,196

(22) Filed: Feb. 15, 2022

(65) Prior Publication Data
US 2023/0260181 A1    Aug. 17, 2023

(51) Int. Cl.
*G06T 17/20* (2006.01)
*G06T 13/40* (2011.01)

(52) U.S. Cl.
CPC .............. *G06T 13/40* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 2011/0148865 A1* | 6/2011 | Lim | G06T 13/40 |
| | | | 345/419 |
| 2016/0328874 A1* | 11/2016 | Tong | G06V 40/161 |
| 2018/0130245 A1* | 5/2018 | Kozlov | G06T 13/40 |
| 2019/0392626 A1* | 12/2019 | Black | G06T 7/75 |
| 2021/0150806 A1* | 5/2021 | Guler | G06T 17/00 |
| 2021/0279956 A1* | 9/2021 | Chandran | G06T 17/20 |
| 2021/0390767 A1* | 12/2021 | Johnson | G06V 40/176 |

* cited by examiner

*Primary Examiner* — Sultana M Zalalee
(74) *Attorney, Agent, or Firm* — Lee & Hayes, P.C.

(57) ABSTRACT

A system may perform head pose neutralization on an input mesh to produce a neutral mesh and/or determine blend shapes for the neutral mesh. The system may generate a neutral mesh based on an input mesh and a reference mesh and then generate a blend shape associated with the neutral mesh based at least in part on one or more reference neutral meshes and one or more corresponding reference blend shapes.

20 Claims, 6 Drawing Sheets

AUTOMATIC HEAD POSE NEUTRALIZATION AND BLEND SHAPE GENERATION

BACKGROUND

In rendering, a character (used herein to also include other articulated objects) may be animated using skeletal animation. Such animation may be based on a neutral pose of the character and blend shapes. However, humans and other entities posing for neutral poses may not replicate the neutral pose correctly. Producing corrected neutral poses for meshes generated from captures of posing entities and then producing blend shapes based thereon may be time consuming and expensive.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
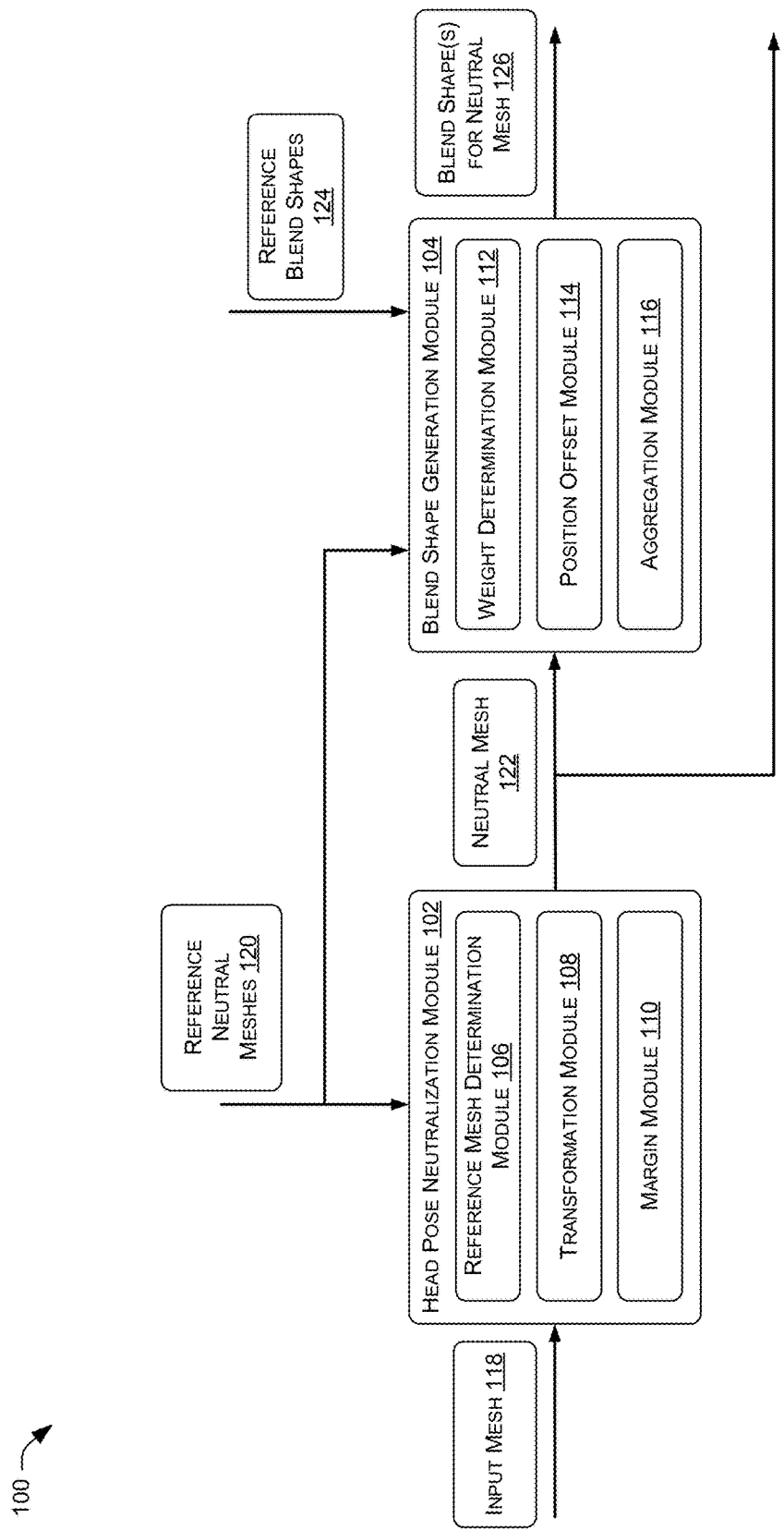
FIG. 1 illustrates a schematic diagram of an example system including a head pose neutralization module that may automatically correct or "neutralize" a head pose of a new ("input") mesh to generate a neutral mesh and a blend shape generation module that may automatically generate blend shapes for a neutral mesh.

Example embodiments of this disclosure describe methods, apparatuses, computer-readable media, and system(s) that may automatically correct or "neutralize" a head pose of a new ("input") mesh to generate a neutral mesh and/or automatically generate blend shapes for a neutral mesh.

More particularly, methods, apparatuses, computer-readable media, and system(s) according to this disclosure may perform neutralization for the head, neck and shoulders of a rigged input mesh (e.g., a rigged mesh generated based on captures of a subject entity the input mesh is to provide an animated likeness of).

Skeletal animation or rigging may represent a character (or other articulated object) in two parts: a surface representation that may be used to draw the character (called the mesh or skin) and a hierarchical set of interconnected parts (called bones, and collectively forming the skeleton or rig), a virtual armature that may be used to animate (pose and keyframe) the mesh. In some examples herein, bones within the hierarchical set of interconnected parts may have children and further descendants as well as parents and further ancestors (e.g., in a tree or similar structure). While this technique may be used to animate humans and other organic figures, the technique can also be used to control the deformation of any other object—such as a door, a spoon, a building, or a galaxy. Generally, rigging may allow the character the rigged mesh represents to be moved. More particularly, in some examples, the rigging information may allow for a soft-definition of how each vertex in the input mesh moves relative to the rest when a bone is moved.

Generally, rigging an object may be performed by taking a digital sculpture and building the skeleton and the muscles. The skin of the character may then be attached to the skeleton. An additional set of animation controls may be used to push and pull the body around.

The bones of the rigged mesh may not correspond to any real-world anatomical feature. Each bone may have a three-dimensional transformation from the default pose (which includes its position, scale and orientation), and an optional parent bone. The bones therefore may form a hierarchy with a root bone. The full transform of a child node may be the product of its parent transform and its own transform. For example, moving a thigh-bone will move the lower leg too. As the character is animated, the bones may change their transformation over time, under the influence of some animation controller. A rig may be generally composed of both forward kinematics and inverse kinematics parts that may interact with each other. Skeletal animation may refer to the forward kinematics part of the rig, where a complete set of bone configurations identifies a unique pose.

Each bone in the skeleton may be associated with some portion of the character's visual representation (the mesh) in a process called skinning. In the most common case of a polygonal mesh character, a bone is associated with a group of vertexes. For example, in a model of a human being, the bone for the thigh is associated with the vertexes making up the polygons in the model's thigh. Further, portions of the character's skin are associated with multiple bones, each one having a scaling factors called vertex weights, or blend weights. The movement of skin near the joints of two bones can, therefore, be influenced by both bones.

The disclosed systems and techniques perform neutralization based on the rigged input mesh and a reference mesh. In some examples, the disclosed techniques include determining the reference mesh based at least in part on reference meshes stored in a reference mesh datastore. In some examples, the reference meshes may be reference neutral meshes that may be neutral meshes previously prepared for other entities or models. In other examples, the reference meshes may be input meshes of a plurality of entities which were captured for generation of neutral meshes but which may deviate in one or more parameters (e.g., before neutralization). An average may be taken of the reference meshes to generate a combined reference neutral mesh. The average of the captured input meshes of the plurality of entities may be suitable for use as a combined reference neutral mesh based on the observation that the deviations in the captured input meshes for the plurality of entities may cancel out or average to the correct neutral pose, particularly over a large number of input meshes. However, examples are not limited to these particular approaches to the selection or determination of the reference mesh used in neutralization.

By using the rigging information of the rigged input mesh, the disclosed systems and techniques allow the poses of the input meshes to be corrected without changing details or soft-body deformation, for example the facial expression or the shape of the mastoid muscles. In some examples, the neutralization of the input mesh based on the reference mesh begins with the topmost bone of the input rigged mesh. A transformation (e.g., average linear transformation) is determined between vertexes of the input mesh that are attached to the current bone and the same vertexes in the reference mesh. In some examples, a singular value decomposition is used to find the average linear transformation. The bone may then be moved based on the average linear transformation into a neutral position which, by extension, may move the vertexes attached thereto into the neutral pose. The transformation determination and move operation may then be performed recursively for the child bones of the current bone (e.g., using a depth first or breadth first approach). In some examples, the process may continue to a designated stopping point. In some examples, the process may continue until there are no remaining unprocessed bones in the input mesh that are attached to the upper extremity of shoulders of the input mesh.

Upon reaching the designated stopping point, an as-rigid-as-possible deformation may be applied between the neutralized portion of the mesh and the non-neutralized portion of the mesh. In some examples, this may smooth the transition and avoid discontinuities in the neutral mesh.

Next, the neutral mesh, reference neutral meshes and sets of blend shapes corresponding to individual reference neutral meshes may be utilized to determine blend shapes for the input mesh. Generally, skeletal animation may move the body parts while blend shapes may be used to provide soft-body deformation on top of the skeletal animation. Blend shapes may be deformed versions of the neutral mesh (e.g., one or more deformed versions representing one or more stages of a smile or other facial expression). In the context of a human face, a neutral mesh of the head may have a neutral expression and pose and blend shapes or "target deformations" are created for other expressions. When the face is being animated, the system may operate to smoothly morph (or "blend") between the neutral mesh and one or several blend shapes.

Some examples may operate on subsets of the vertexes of the neutral mesh (e.g., regions or areas) which may be applied in combination to the neutral mesh to generate the complete blend shape. Generating a blend shape for a neutral mesh may include determining weights for individual reference neutral meshes for the subsets of vertexes of the neutral mesh. In some examples, the weights may be determined as a linear combination of reference neutral meshes for the individual subsets of vertexes of the neutral mesh. For example, systems and methods according to this disclosure may register each subset of vertexes of the input neutral mesh as a linear combination of the same subset of vertexes in the reference neutral meshes using a least square linear regression between the input neutral mesh and the individual reference neutral meshes. Next, for each reference neutral mesh and subset of vertexes, linear position offsets may be calculated between the vertexes of the reference neutral mesh and vertexes of the blend shape associated with the particular reference neutral mesh. In some examples, the subsets of vertexes may be predefined or specified by input from the user (e.g., with or separate from the mesh(es) and/or shape(s)). Examples shown and discussed herein include the subset definitions being received with the mesh(es) and/or shape(s), but examples are not so limited. Further, some examples may utilize the set of vertexes as a whole.

The weights determined for the subsets of vertexes of the individual reference neutral meshes may be applied to the linear position offsets determined for the same subsets of vertexes to determine weighted offsets for individual combinations of reference neutral meshes and subsets of vertexes. These weighted offsets may then be added to the input neutral mesh to generate the desired blend shape for the neutral mesh. This process may then be repeated for other blend shapes.

In some examples, the linear position offsets may be stored along with the associated blend shape and reference neutral mesh and used for a subsequent neutral meshes (e.g., rather than repeat the determination of the linear position offsets for each neutral mesh). Additionally or alternatively, the linear position offsets may be determined and stored for neutral meshes once the blend shapes for the neutral mesh has been determined. When the neutral mesh is subsequently used as a reference neutral mesh for another neutral mesh, the stored linear position offset may be used instead of being generated on demand.

Certain implementations and embodiments of the disclosure will now be described more fully below with reference to the accompanying figures, in which various aspects are shown. However, the various aspects may be implemented in many different forms and should not be construed as limited to the implementations set forth herein. For example, while discussed primarily herein in the context of the head-neck-shoulder neutral pose of a human model, other examples may relate to the neutral pose of other entities or object (e.g., an animal or machine model) and/or may relate to another portion of the model or the entire model. Further, some examples may generate neutral meshes but not generate blend shapes or generate blend shapes but not generate neutral meshes. Moreover, embodiments may vary and are not limited in the computing devices or processors that may perform operations to generate neutral meshes and blend shapes. It will be appreciated that the disclosure encompasses other variations of the embodiments, as described herein. Like numbers refer to like elements throughout.

FIG. 1 illustrates a schematic diagram of an example system 100 including a head pose neutralization module 102 that may automatically correct or "neutralize" a head pose of a new ("input") mesh to generate a neutral mesh and a blend shape generation module 104 that may automatically generate blend shapes for a neutral mesh. The head pose neutralization module 102 may include a reference mesh determination module 106, a transformation module 108, and a margin module 110 and the blend shape generation module 104 may include a weight determination module 112, a position offset module 114, and an aggregation module 116.

In operation, the head pose neutralization module 102 may receive an input mesh 118 that may be a representation of, for example, an entity (e.g., a person) captured while attempting to pose in a neutral position for purposes of creating a 3D model representing the entity. The head pose neutralization module 102 may retrieve one or more reference neutral meshes 120 from a reference datastore (not shown). In some examples, the input mesh 118 and the reference neutral meshes 120 may be a rigged meshes. As discussed below, the components of the head pose neutralization module 102 may determine a neutral mesh 122 for the input mesh 118 based at least in part on the reference neutral meshes 120 using the rigging information of each. By using the rigging information of the rigged input mesh and the rigged reference neutral meshes 120, the components of the head pose neutralization module 102 may allow the poses of the input meshes 118 to be corrected without changing details or soft-body deformation (e.g., without changing the facial expression or the shape of the mastoid muscles of the input mesh 118). In some examples, neutralization of the head, neck and shoulders may not impact the expression, muscles, and so on of the rigged mesh. For example, the input mesh may have a set of muscle and/or expression values (e.g., soft body deformation values of the modeled entity). The neutralization process may be performed such that, after the generation of the neutral mesh, those values of the neutral mesh may be same as the one or more values of the input mesh (e.g., the values (e.g., position of the muscles) may be unchanged/not deformed by the neutralization process).

Figure 2:
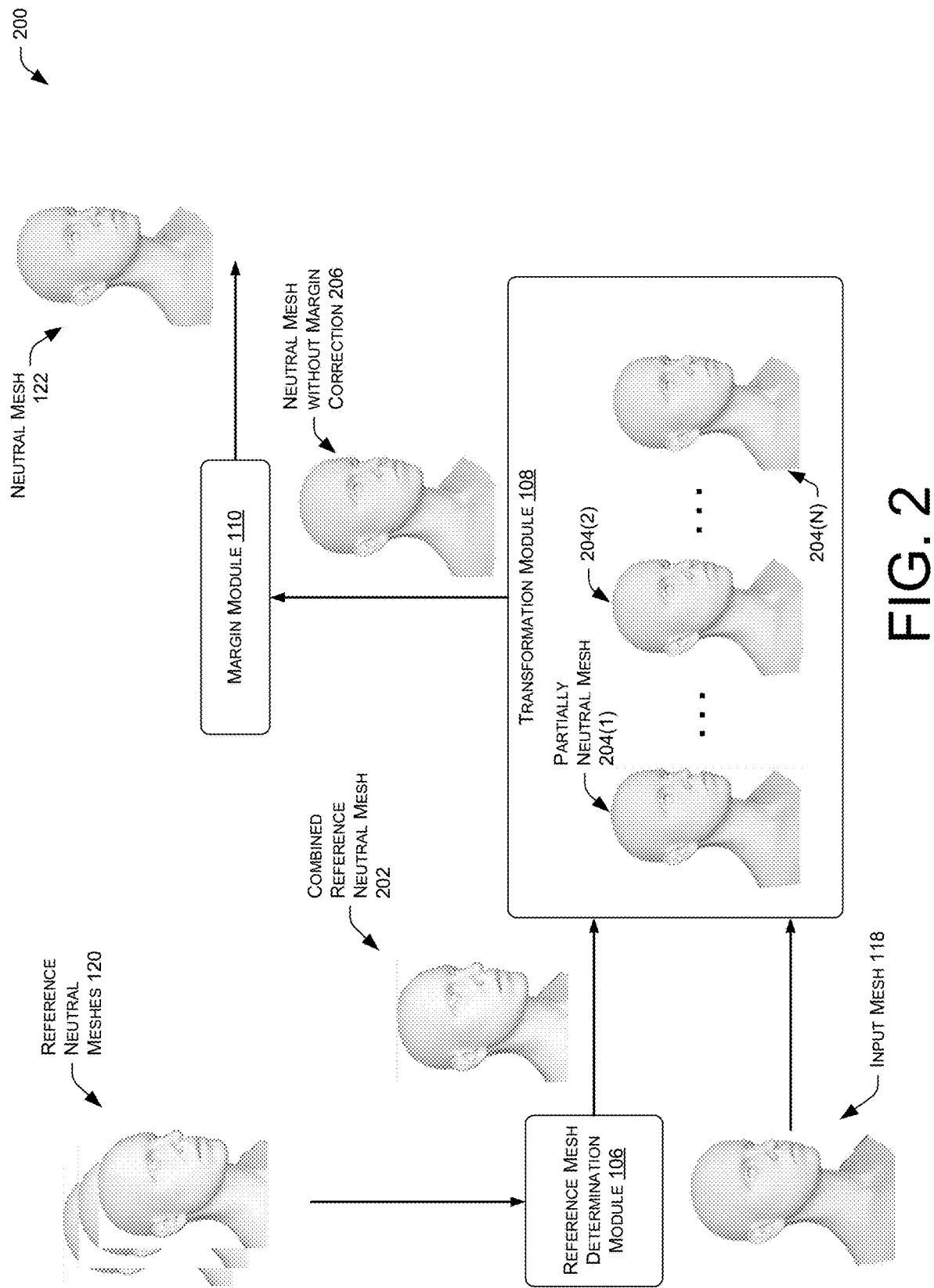
FIG. 2 illustrates a schematic diagram of an example system including the modules of the head pose neutralization module and showing the operations of the modules of the head pose neutralization module to generate the neutral mesh.

FIG. 2 illustrates a schematic diagram of an example system 200 including the modules of the head pose neutralization module 102 and showing the operations of the modules 106-110 to generate the neutral mesh 122.

The reference mesh determination module 106 may receive the reference neutral meshes 120. Based on the reference neutral meshes 120, the reference mesh determination module 106 may determine an average of or otherwise combine the reference neutral meshes 120 to generate a combined reference neutral mesh 202 for use in head pose neutralization by the transformation module 108. In some examples, such as the illustrated example of FIG. 2, the reference neutral meshes 120 may be neutral meshes previously prepared for other entities or models. In other examples, the reference neutral meshes 120 may be input meshes of a plurality of entities which were captured for generation of neutral meshes but which may deviate in one or more parameters from the neutral pose. The average of the captured input meshes of the plurality of entities may be suitable for use as a combined reference neutral mesh 202 based on the observation that the deviations in the captured input meshes for the plurality of entities may cancel out or otherwise average to the correct neutral pose, particularly over a large number of input meshes. While discussed herein as generating a combined reference neutral mesh 202 "on-demand" for each input mesh 118, some examples may generate and store a combined reference neutral mesh 202 for head pose neutralization periodically or based on another trigger or schedule and retrieve the current stored version of the combined reference neutral mesh 202 when determining a neutral mesh 122 from an input mesh 118. Moreover, examples are not limited to using an average or combined reference neutral mesh 202 to perform head pose neutralization. Other examples may utilize other reference meshes which may vary based on implementation details.

The transformation module 108 may receive the combined reference neutral mesh 202 and the input mesh 118. The transformation module 108 may then perform pose correction on the input mesh 118 based on the combined reference neutral mesh 202 from the reference mesh determination module 106 (or another reference mesh). In some examples, the neutralization or correction of the head pose of the input mesh 118 based on the combined reference neutral mesh 202 may begin with the topmost bone of the input mesh 118. In some examples, the skull may be a topmost bone in a hierarchy of bones and one or more other bones may be child bones in the hierarchy below the skull and/or parent bones of still other bones. The transformation module 108 may repeat the neutralization or correction of the head pose recursively for the child bones of the topmost bone (e.g., using a depth first or breadth first approach) with each recursion producing a partially neutral mesh 204(1)-204(N). As discussed above, the process disclosed herein may be applied to other models or portions of human models. In such examples, the topmost bone in the hierarchy may be the body part or other portion of the model used for stabilization.

In some examples, the transformation module 108 may continue to perform neutralization for child bones recursively until reaching a designated stopping point. For example, the upper extremity of shoulders of the input mesh 118 may be a designated stopping point and the transformation module 108 may continue until there are no remaining unprocessed bones in the input mesh 118 that are attached to the upper extremity of shoulders of the input mesh 118.

To perform neutralization for the current bone of the input mesh 118, the transformation module 108 determine a transformation (e.g., average linear transformation) between vertexes of the input mesh 118 that are attached to the current bone and the same vertexes in the combined reference neutral mesh. In some examples, a singular value decomposition may be used to find the average linear transformation between vertexes of the input mesh 118 that are attached to the current bone and the same vertexes in the combined reference neutral mesh. The average linear transformation may be utilized to move or reorient the current bone into a correct neutral pose. As indicated above, the transformation module 108 may continue performing pose correction on the bones of the input mesh 118 to a designated stopping point, such as the upper extremity of the shoulders. Having performed pose correction transformations to the bones from the top of the rigged input mesh 118 to the upper extremity of the shoulders, the head-neck-shoulder pose may have been transformed to the neutral pose. Then, the resulting neutral mesh without margin correction 206 may be output from the transformation module 108 to the margin module 110.

The margin module 110 may receive the neutral mesh without margin correction 206 and operate to apply a deformation between the neutralized portion of the mesh and the non-neutralized portion of the mesh. In some examples, the deformation may smooth the transition and avoid discontinuities in the neutral mesh 122. Without limitation, in some examples, the margin module 110 may use an as-rigid-as-possible deformation. The margin module 110 may then output the result as a neutral mesh 122.

Returning to FIG. 1, the blend shape generation module 104 may operate to receive the neutral mesh 122 from the head pose neutralization module 102 and generate one or more blend shapes 126 for the neutral mesh 122 (and, by extension, input mesh 118) based on the neutral mesh 122, the reference neutral meshes 120 and respective sets of reference blend shapes 124 of the reference neutral meshes 120. More particularly, the blend shape generation module 104 may operate on one or more subsets of the vertexes of the meshes and/or shapes 120, 122, and 124 (e.g., regions or areas) which may be combined to generate the whole blend shapes 126 (e.g., the same subsets, regions or areas may be present in the meshes and/or shapes 120, 122, and 124). As mentioned above, blend shapes 126 may be deformed versions of the neutral mesh 122 (e.g., one or more deformed versions representing one or more stages of a smile or other facial expression). Using a human face as an example, the neutral mesh 122 of the head may have a neutral expression and pose and a blend shape or "target deformation" may be generated for each other expression. When the face is being animated, a system may operate to smoothly morph (or "blend") between the neutral mesh 122 and one or several blend shapes 126.

Figure 3:
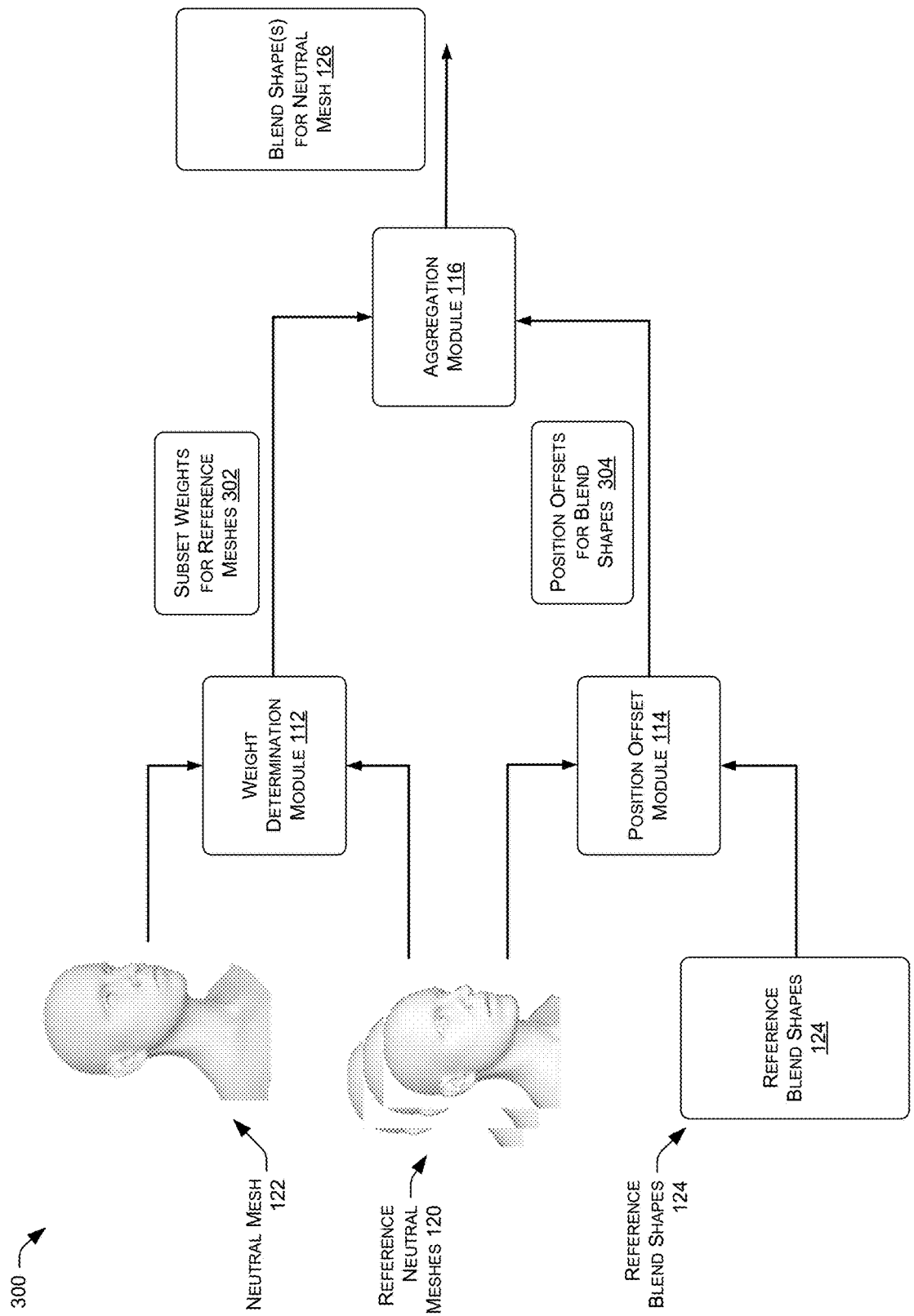
FIG. 3 illustrates a schematic diagram of an example system including the modules of the blend shape generation module and showing the operations of the modules of the blend shape generation module to generate the blend shape(s) for the neutral mesh.

FIG. 3 illustrates a schematic diagram of an example system 300 including the modules of the blend shape generation module 104 and showing the operations of the modules 112-116 to generate the blend shape(s) 126 for the neutral mesh 122.

In operation, the weight determination module 112 may receive the neutral mesh 122 and reference neutral meshes 120. The weight determination module 112 may then operate to determine weights for the individual reference neutral meshes 120. More particularly, the weight determination module 112 may determine subset weights 302 for individual reference neutral meshes for the subsets of vertexes of the meshes 120 and 122. In some examples, the weights may be determined as a linear combination of reference neutral meshes 120 for the individual subsets of vertexes. For example, the weight determination module 112 may register each subset of vertexes of the neutral mesh 122 as a linear combination of the same subset of vertexes in the reference neutral meshes 120 using a least square linear regression between the neutral mesh 122 and the individual reference neutral meshes 120. For example, for a cheek region of the meshes 120-124, the weight determination module 112 may perform a linear least square regression to minimize:

$$\frac{1}{2}\|Ax - b\|^2$$

where matrix A including the values of the vertexes in the cheek regions of the reference neutral meshes and having a shape [V, R] with V being the number of vertex values in the cheek region and R being the number of reference neutral meshes 120, matrix b including the cheek region vertexes values of the neutral mesh 122 and being of shape [V, 1], and where matrix x includes the weights to be determined by the linear least square regression and being of shape [R, 1] and where weights are subject to upper and lower bounds. Once minimized, the values of x may represent subset weights for corresponding reference neutral meshes for that particular region. The weight determination module 112 may then output the subset weights 302 for the reference neutral meshes to the aggregation module 116.

The position offset module 114 may receive the reference neutral meshes 120 and the reference blend shapes 124. Although not apparent in FIG. 3, the reference blend shapes 124 may be one or more deformed versions representing one or more stages of a smile or other facial expressions for the reference neutral meshes 120. The position offset module 114 may then operate to determine, for each reference neutral mesh and subset of vertexes, linear position offsets between the vertexes of the reference neutral mesh and vertexes of the blend shape associated with the particular reference neutral mesh. The position offset module 114 may then output the position offsets 304 for blend shapes to the aggregation module 116.

The aggregation module 116 may receive the subset weights 302 for the reference neutral meshes and the position offsets 304 for blend shapes. The aggregation module 116 may then apply the position offsets 304 for blend shapes to the subset weights 302 for the reference neutral meshes to determine weighted offsets for individual combinations of reference neutral meshes and subsets of vertexes. These weighted offsets may then be added to the neutral mesh 122 to generate the desired blend shape(s) 126 for the neutral mesh. This process may then be repeated for other blend shapes.

In some examples, the position offsets 304 may be stored along with the associated blend shape and reference neutral mesh and used for a subsequent neutral mesh (e.g., rather than repeat the determination of the linear position offsets for each subsequent neutral mesh). Additionally or alternatively, the position offsets 304 may be determined and stored for neutral meshes once the blend shapes for the neutral mesh 122 have been determined. When the neutral mesh 122 is subsequently used as a reference neutral mesh 120 for another neutral mesh 122, the stored linear position offsets may be used instead of being generated on demand.

The neutral meshes 122 and blend shapes 126 for the neutral mesh may then be stored in the reference database for use in animation and for determining neutral meshes and blend shapes for further input meshes. As mentioned above, animation may be generated at least in part by interpolating between the neutral meshes 122 and blend shapes 126.

The head pose neutralization module and blend shape generation module may perform additional operations in addition to those discussed above. For example, in some examples, the head pose neutralization module and/or blend shape generation module may include further functionality to pre-process one or more of the meshes and/or shapes 118-124. For example, the head pose neutralization module and/or blend shape generation module may perform operations to harmonize or standardize the various meshes and/or shapes into a shared coordinate system and/or scale. In addition, in some examples, the head pose neutralization module and/or blend shape generation module that may invert or otherwise modify the hierarchy of the rigging or perform other modifications of the meshes. For example, the input mesh 118 may include a hierarchy of bones that has the base of the spine as the root of the hierarchy. In such an example, the head pose neutralization module and/or blend shape generation module may include functionality to invert the hierarchy of the bones which may result in the cranium or skull being the root of the hierarchy. These and other variations would be understood by one of ordinary skill in the art in view of this disclosure.

Figure 4:
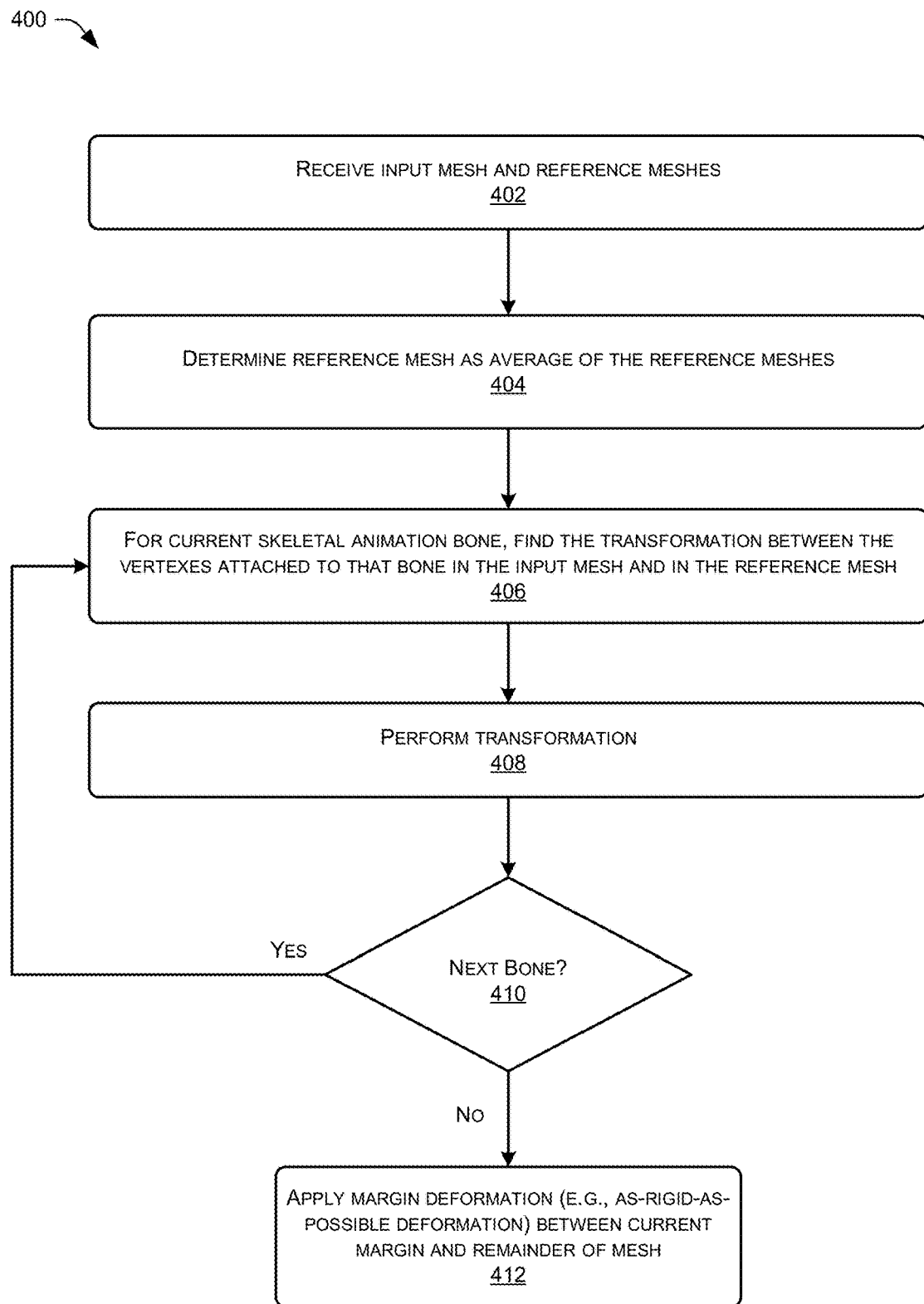
FIG. 4 illustrates a flow diagram of an example method that may be performed by a head pose neutralization module to determine a neutral mesh based on an input mesh.

FIG. 4 illustrates a flow diagram of an example method 400 that may be performed by a head pose neutralization module to determine a neutral mesh based on an input mesh. The method 400 may be performed by the system 100 as discussed above.

At block 402, the head pose neutralization module may receive an input mesh (e.g., input mesh 118) and one or more reference meshes (e.g., reference neutral meshes 120). In some examples, the one or more reference meshes may include input meshes (e.g., pre-neutralized meshes), reference neutral meshes or some combination thereof. At 404, the head pose neutralization module may determine a reference mesh as an average or other combination of the one or more reference meshes.

Then, at 406, for a current skeletal animation bone of the input mesh, the head pose neutralization module may find the transformation between the vertexes attached to that bone in the input mesh and in the reference mesh. In some examples, a singular value decomposition may be used to find the average linear transformation between vertexes of the input mesh 118 that are attached to the current bone and the same vertexes in the combined reference neutral mesh.

Next, at 408, the head pose neutralization module may utilize the average linear transformation move or reorient the current bone into a neutral pose.

The head pose neutralization module may then determine if another skeletal animation bone remains to be processed (e.g., based on a designated stopping point) at 410. For example, the head pose neutralization module may determine if another child bone of the current bone or a descendent bone of an ancestor bone of the current bone before a designated stopping point remains unprocessed. If so, the process may return to 406 for the next bone. Otherwise, the process may continue to 412.

At 412, the head pose neutralization module may apply a margin deformation (e.g., an as-rigid-as-possible deformation) between a current margin and remainder of mesh to produce a neutral mesh. As discussed above, in some examples, this operation may smooth the transition between the portions of the mesh that have been affected by the movement of bone during the neutralization of the head-neck-shoulder pose.

Following 412, the head pose neutralization module may output the neutral mesh for use in animation, the neutral mesh may be further utilized by the blend shape generation module in generating blend shapes for the neutral mesh and/or the neutral mesh may be stored in a reference mesh datastore for use as a reference neutral mesh in neutralizing future input meshes.

It should be noted that some of the operations of method 400 may be performed out of the order presented, with additional elements, and/or without some elements. Some of the operations of method 400 may further take place substantially concurrently and, therefore, may conclude in an order different from the order of operations shown above. Further, implementations are not limited to the details of the above examples and variations are possible.

Figure 5:
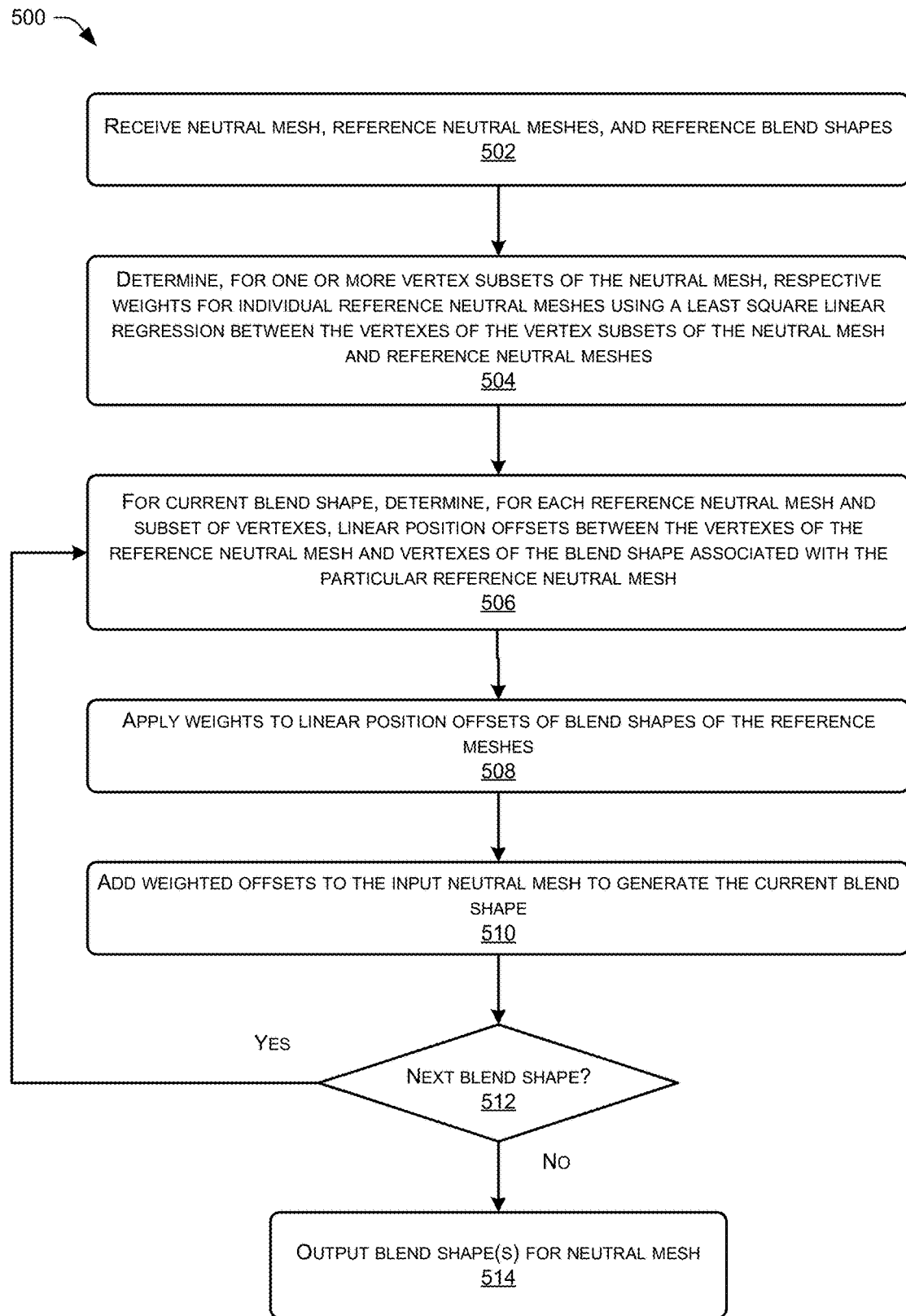
FIG. 5 illustrates a flow diagram of an example method that may be performed by a blend shape generation module to determine one or more blend shapes for a neutral mesh.

FIG. 5 illustrates a flow diagram of an example method 500 that may be performed by a blend shape generation module to determine one or more blend shapes for a neutral mesh. The method 500 may be performed by the system 100 as discussed above.

At 502, the blend shape generation module may receive a neutral mesh, one or more reference neutral meshes, and one or more reference blend shapes. As discussed above, the one or more reference blend shapes may include one or more sets of blend shapes, individual sets of which correspond to respective individual reference neutral meshes. The blend shape generation module may operate on one or more subsets of the vertexes of the meshes (e.g., regions or areas) which may be combined to generate the whole blend shapes (e.g., the same subsets, regions or areas may be present in the neutral mesh, the reference neutral meshes and the reference blend shapes).

At 504, the blend shape generation module may determine, for one or more vertex subsets of the neutral mesh, respective weights for individual reference neutral meshes using a least square linear regression between the vertexes of the vertex subsets of the neutral mesh and reference neutral meshes. More particularly, the blend shape generation module may determine subset weights for individual reference neutral meshes for the subsets of vertexes of the neutral mesh. In some examples, the weights may be determined as a linear combination of reference neutral meshes for the individual subsets of vertexes. For example, the blend shape generation module may register each subset of vertexes of the neutral mesh as a linear combination of the same subset of vertexes in the reference neutral meshes using a least square linear regression between the neutral mesh 122 and the individual reference neutral meshes 120.

At 506, for a current blend shape, the blend shape generation module may determine, for each reference neutral mesh and subset of vertexes, linear position offsets between the vertexes of the reference neutral mesh and vertexes of the blend shape associated with the particular reference neutral mesh.

Then, at 508, the blend shape generation module may apply the weights to the linear position offsets of the blend shapes of the reference meshes. The blend shape generation module may then add the weighted offsets to the input neutral mesh to generate the current blend shape for the neutral mesh.

The blend shape generation module may then determine whether another (e.g., next) blend shape remains to be generated for the neutral mesh at 512. If so, the process may return to 506 for the next blend shape. Otherwise, the process may continue to 514, where the blend shape generation module may output the blend shape(s) for the neutral mesh Following 512, the blend shape generation module may output the blend shape(s) for use with the neutral mesh in animation and/or the blend shape(s) may be stored in the reference database for use as reference blend shapes for future neutral meshes.

Figure 6:
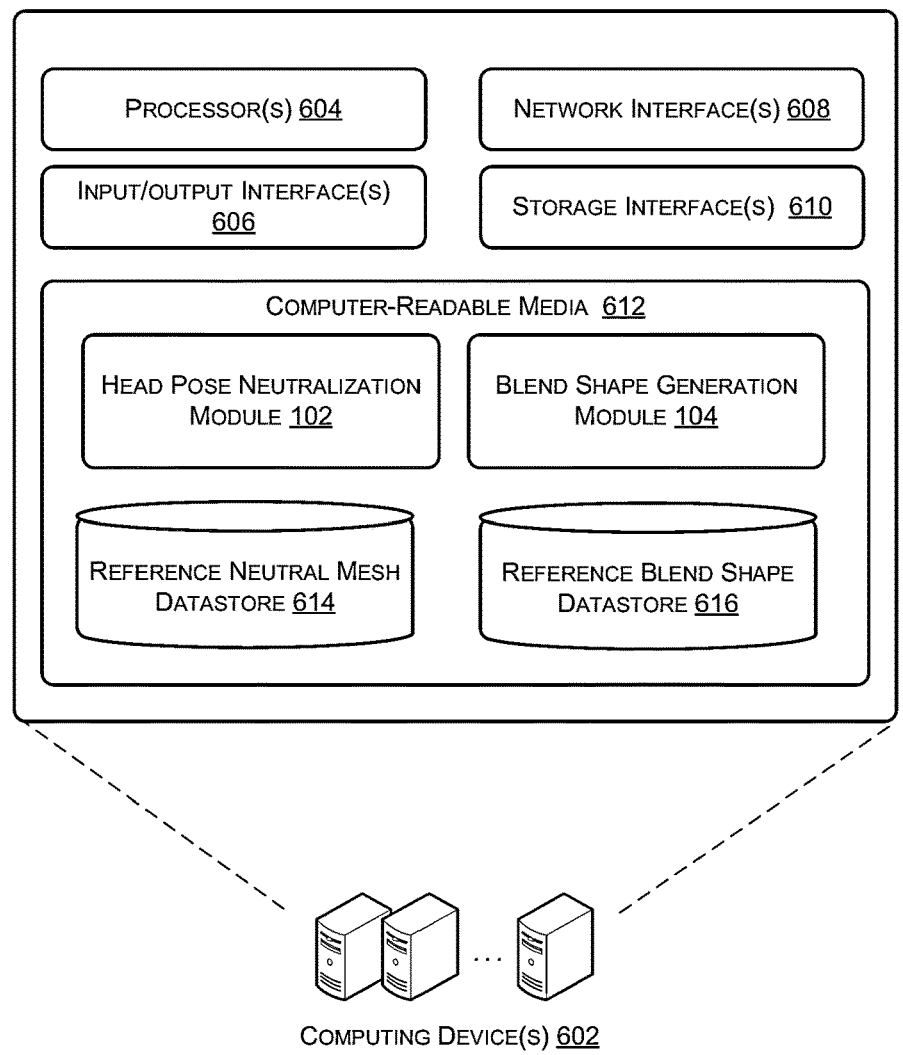
FIG. 6 illustrates a block diagram of an example system including one or more computing device(s) that may automatically correct or "neutralize" a head pose of a new ("input") mesh to generate a neutral mesh and that may automatically generate blend shapes for the neutral mesh, in accordance with example embodiments of the disclosure.

FIG. 6 illustrates a block diagram of an example system 600 including one or more computing device(s) 602 that may automatically correct or "neutralize" a head pose of a new ("input") mesh to generate a neutral mesh and that may automatically generate blend shapes for the neutral mesh, in accordance with example embodiments of the disclosure. The computing device(s) 602 may include one or more processor(s) 604, one or more input/output (I/O) interface(s) 606, one or more network interface(s) 608, one or more storage interface(s) 610, and computer-readable media 612.

In some implementations, the processors(s) 604 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 604 may possess its own local memory, which also may store program modules, program data, and/or one or more operating system(s). The one or more processor(s) 604 may include one or more cores.

The one or more input/output (I/O) interface(s) 606 may enable a user to interact with a user interface module (e.g., to provide input to and receive output from a user application operating on the system 600). The I/O interface(s) 606 may include a combination of hardware, software, and/or firmware and may include software drivers for enabling the operation of any variety of I/O device(s) integrated on the system 100 or with which the system 100 interacts, such as displays, microphones, speakers, cameras, switches, and any other variety of sensors, or the like.

The network interface(s) 608 may enable the system(s) 100 to communicate via the one or more network(s). The network interface(s) 608 may include a combination of hardware, software, and/or firmware and may include software drivers for enabling any variety of protocol-based communications, and any variety of wireline and/or wireless ports/antennas. For example, the network interface(s) 608 may comprise one or more of a cellular radio, a wireless (e.g., IEEE 802.1x-based) interface, a Bluetooth® interface, and the like. In some embodiments, the network interface(s) 608 may include radio frequency (RF) circuitry that allows the system(s) 100 to transition between various standards. The network interface(s) 608 may further enable the system(s) 100 to communicate over circuit-switch domains and/or packet-switch domains.

The storage interface(s) 610 may enable the processor(s) 604 to interface and exchange data with the computer-readable media 612, as well as any storage device(s) external to the system(s) 100, such as the head pose neutralization module 102, the blend shape generation module 104, the reference neutral mesh datastore 614, and the reference blend shape datastore 616.

The computer-readable media 612 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 612 may be implemented as computer-readable storage media (CRSM), which may be any available physical media accessible by the processor(s) 604 to execute instructions stored on the computer-readable media 612. In one basic implementation, CRSM may include RAM and Flash memory. In other implementations, CRSM may include, but is not limited to, ROM, EEPROM, or any other tangible medium which can be used to store the desired information and which can be accessed by the processor(s) 604. The computer-readable media 612 may have an operating system (OS) and/or a variety of suitable applications stored thereon. The OS, when executed by the processor(s) 604 may enable management of hardware and/or software resources of the system(s) 100.

Several functional blocks having instruction, data stores, and so forth may be stored within the computer-readable media 612 and configured to execute on the processor(s) 604. The computer-readable media 612 may have stored thereon the head pose neutralization module block 102, the blend shape generation module 104, the reference neutral mesh datastore 614, and the reference blend shape datastore 616. It will be appreciated that each of the functional blocks may have instructions stored thereon that when executed by the processor(s) 604 may enable various functions pertaining to the operations of the system(s) 100.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices. Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
    one or more processors; and
    one or more computer-readable media storing computer-executable instructions that, when executed by the one or more processors, cause the one or more processors to:
        generate a neutral mesh based on an input mesh and a reference mesh, wherein generating the neutral mesh includes:
            determining, for one or more skeletal animation bones of the input mesh, a respective transformation between one or more input mesh vertexes of the input mesh associated with individual skeletal animation bones and corresponding reference mesh vertexes of the reference mesh; and
            generating the neutral mesh at least partly by moving the one or more skeletal animation bones based on the respective transformations;
        generate a blend shape associated with the neutral mesh based at least in part on one or more reference neutral meshes and one or more corresponding reference blend shapes, wherein generating the blend shape includes:
            determining, for a vertex subset of the neutral mesh, respective weights for individual reference neutral meshes based on vertexes of the vertex subset of the neutral mesh and vertexes of the vertex subset of the individual reference neutral meshes;
            determining, for individual reference neutral meshes, respective linear position offsets between the vertexes of the vertex subset of the individual reference neutral mesh and vertexes of the vertex subset of the respective reference blend shape associated with the individual reference neutral mesh;
            determine weighted position offsets by applying the respective weights for individual reference neutral meshes to the respective linear position offsets of the individual reference neutral meshes; and
            adding the weighted position offsets to the vertexes of the vertex subset of the neutral mesh.

2. The system of claim 1, wherein the computer-executable instructions further cause the one or more processors to determine the reference mesh based at least in part on the one or more reference neutral meshes and wherein the reference mesh is determined as an average of the one or more reference neutral meshes.

3. The system of claim 2, wherein the one or more skeletal animation bones of the input mesh are related in a tree hierarchy, a root of the tree hierarchy is a topmost bone of the input mesh and the moving of the one or more skeletal animation bones based on the respective transformations is performed recursively beginning at the root of the tree hierarchy until a designated stopping point is reached.

4. The system of claim 3, wherein the computer-executable instructions that further cause the one or more processors to perform an as-rigid-as-possible deformation between a margin of the input mesh affected by the moving and a remainder of the input mesh.

5. The system of claim 1, wherein the determining, for the vertex subset of the neutral mesh, the respective weights for the individual reference neutral meshes is performed at least in part by using a least square linear regression between the vertexes of the vertex subset of the neutral mesh and the vertexes of the vertex subset of the individual reference neutral meshes.

6. The system of claim 1, wherein the vertex subset of the neutral mesh includes vertexes of a region of the neutral mesh, the neutral mesh includes one or more other regions, and the generating the blend shape associated with the neutral mesh includes, for other vertex subsets representing the other regions, performing the determining of other respective weights, the determining of respective other linear position offsets, the determining of other weighted position offsets and the adding of the other weighted position offsets to the neutral mesh.

7. A computer-implemented method comprising:
    determining, for one or more skeletal animation bones of an input mesh, a respective transformation between one or more input mesh vertexes of the input mesh associated with individual skeletal animation bones and corresponding reference mesh vertexes of a reference mesh; and
    generating a neutral mesh at least partly by moving the one or more skeletal animation bones based on the respective transformations.

8. The computer-implemented method of claim 7, further comprising:
    determining the reference mesh based at least in part on one or more reference neutral meshes.

9. The computer-implemented method of claim 8, wherein the reference mesh is determined as an average of the one or more reference neutral meshes.

10. The computer-implemented method of claim 7, wherein the one or more skeletal animation bones of the input mesh are related in a tree hierarchy, a root of the tree hierarchy is a topmost bone of the input mesh and the moving of the one or more skeletal animation bones based on the respective transformations is performed recursively beginning at the root of the tree hierarchy until a designated stopping point is reached.

11. The computer-implemented method of claim 10, wherein generating the neutral mesh further comprises:
    subsequent to the moving the one or more skeletal animation bones based on the respective transformations, performing an as-rigid-as-possible deformation between a margin of the input mesh affected by the moving and a remainder of the input mesh.

12. The computer-implemented method of claim 11, further comprising:
generating a blend shape associated with the neutral mesh based at least in part on one or more reference neutral meshes and one or more corresponding reference blend shapes, wherein generating the blend shape includes:
determining, for a vertex subset of the neutral mesh, respective weights for individual reference neutral meshes using a least square linear regression between vertexes of the vertex subset of the neutral mesh and vertexes of the vertex subset of the individual reference neutral meshes;
determining, for individual reference neutral meshes, respective linear position offsets between the vertexes of the vertex subset of the individual reference neutral mesh and vertexes of the vertex subset of the respective reference blend shape associated with the individual reference neutral mesh;
determine weighted position offsets by applying the respective weights for individual reference neutral meshes to the respective linear position offsets of the individual reference neutral meshes; and
adding the weighted position offsets to the vertexes of the vertex subset of the neutral mesh to at least partially generate the blend shape.

13. The computer-implemented method of claim 12, wherein the vertex subset of the neutral mesh includes vertexes of a region of the neutral mesh, the neutral mesh includes one or more other regions, and the generating the blend shape associated with the neutral mesh includes, for other vertex subsets representing the other regions, performing the determining of other respective weights, the determining of respective other linear position offsets, the determining of other weighted position offsets and the adding of the other weighted position offsets to the neutral mesh.

14. One or more non-transitory computer-readable media storing computer-executable instructions that, when executed by one or more processors, cause the one or more processors to perform operations comprising:
determining, for one or more skeletal animation bones of an input mesh, a respective transformation between one or more input mesh vertexes of the input mesh associated with individual skeletal animation bones and corresponding reference mesh vertexes of a reference mesh; and
generating a neutral mesh at least partly by moving the one or more skeletal animation bones based on the respective transformations.

15. The one or more non-transitory computer-readable media of claim 14, the operations further comprising:
determining the reference mesh based at least in part on one or more reference neutral meshes.

16. The one or more non-transitory computer-readable media of claim 15, wherein the reference mesh is determined as an average of the one or more reference neutral meshes.

17. The one or more non-transitory computer-readable media of claim 14, wherein the one or more skeletal animation bones of the input mesh are related in a tree hierarchy, a root of the tree hierarchy is a topmost bone of the input mesh and the moving of the one or more skeletal animation bones based on the respective transformations is performed recursively beginning at the root of the tree hierarchy until a designated stopping point is reached.

18. The one or more non-transitory computer-readable media of claim 17, wherein generating the neutral mesh further comprises:
subsequent to the moving the one or more skeletal animation bones based on the respective transformations, performing an as-rigid-as-possible deformation between a margin of the input mesh affected by the moving and a remainder of the input mesh.

19. The one or more non-transitory computer-readable media of claim 18, the operations further comprising:
generating a blend shape associated with the neutral mesh based at least in part on one or more reference neutral meshes and one or more corresponding reference blend shapes, wherein generating the blend shape includes:
determining, for a vertex subset of the neutral mesh, respective weights for individual reference neutral meshes using a least square linear regression between vertexes of the vertex subset of the neutral mesh and vertexes of the vertex subset of the individual reference neutral meshes;
determining, for individual reference neutral meshes, respective linear position offsets between the vertexes of the vertex subset of the individual reference neutral mesh and vertexes of the vertex subset of the respective reference blend shape associated with the individual reference neutral mesh;
determine weighted position offsets by applying the respective weights for individual reference neutral meshes to the respective linear position offsets of the individual reference neutral meshes; and
adding the weighted position offsets to the vertexes of the vertex subset of the neutral mesh to at least partially generate the blend shape.

20. The one or more non-transitory computer-readable media of claim 19, wherein the vertex subset of the neutral mesh includes vertexes of a region of the neutral mesh, the neutral mesh includes one or more other regions, and the generating the blend shape associated with the neutral mesh includes, for other vertex subsets representing the other regions, performing the determining of other respective weights, the determining of respective other linear position offsets, the determining of other weighted position offsets and the adding of the other weighted position offsets to the neutral mesh.

* * * * *